US006991708B2

(12) United States Patent  
Schorn et al.

(10) Patent No.: US 6,991,708 B2  
(45) Date of Patent: Jan. 31, 2006

(54) CONTINUOUS VACUUM PAN

(75) Inventors: Paul Martin Schorn, La Lucia (ZA); Leon Smith, La Lucia (ZA)

(73) Assignee: The Tongaat-Hulett Group Limited, La Lucia (ZA)

( * ) Notice: Subject to any disclaimer, the term of this patent is extended or adjusted under 35 U.S.C. 154(b) by 759 days.

(21) Appl. No.: 10/041,602

(22) Filed: Jan. 10, 2002

(65) Prior Publication Data

US 2002/0117268 A1  Aug. 29, 2002

Related U.S. Application Data

(63) Continuation of application No. PCT/IB01/00942, filed on May 30, 2001.

(30) Foreign Application Priority Data

Jun. 1, 2000  (ZA) ................................ 2000/2746

(51) Int. Cl.  
 B01D 3/10 (2006.01)

(52) U.S. Cl. .................... 202/205; 159/26.1; 159/27.1; 159/27.5; 159/28.2

(58) Field of Classification Search ................ 202/205; 159/26.1, 27.1, 27.5, 28.2  
See application file for complete search history.

(56) References Cited

U.S. PATENT DOCUMENTS

| 3,880,593 A | 4/1975 | Windal ...................... 23/273 R |
| 4,412,887 A * | 11/1983 | Dye ........................... 159/47.1 |
| 4,816,076 A * | 3/1989 | Rein ............................ 127/16 |

FOREIGN PATENT DOCUMENTS

| EP | 0 172 965 A1 | 3/1986 |
| EP | 0 201 629 A2 | 11/1986 |
| GB | 585583 | 2/1947 |
| GB | 621797 | 4/1949 |
| GB | 2003741 | 3/1979 |

* cited by examiner

Primary Examiner—N. Bhat  
(74) Attorney, Agent, or Firm—Collier Shannon Scott PLLC

(57) ABSTRACT

A continuous vacuum pan includes a cylindrical housing having a vertical axis, at least one liquid heating pan within the housing, and a vertical tube, floating calandria within the liquid heating pan. The vertical tube floating calandria has a downcomer between its periphery and the periphery of the liquid heating pan, and a gap is provided between the bottom of the calandria and the bottom of the liquid heating pan. Radially extending baffles in the liquid heating pan define a plurality of compartments located in series with one another, the compartments ranging from a first upstream compartment to a downstream output compartment. Ports are provided in all of the baffles except in the baffle between the output compartment and the first compartment. The ports are spaced from the bottom of the liquid heating pan, permitting communication between the compartments.

23 Claims, 11 Drawing Sheets

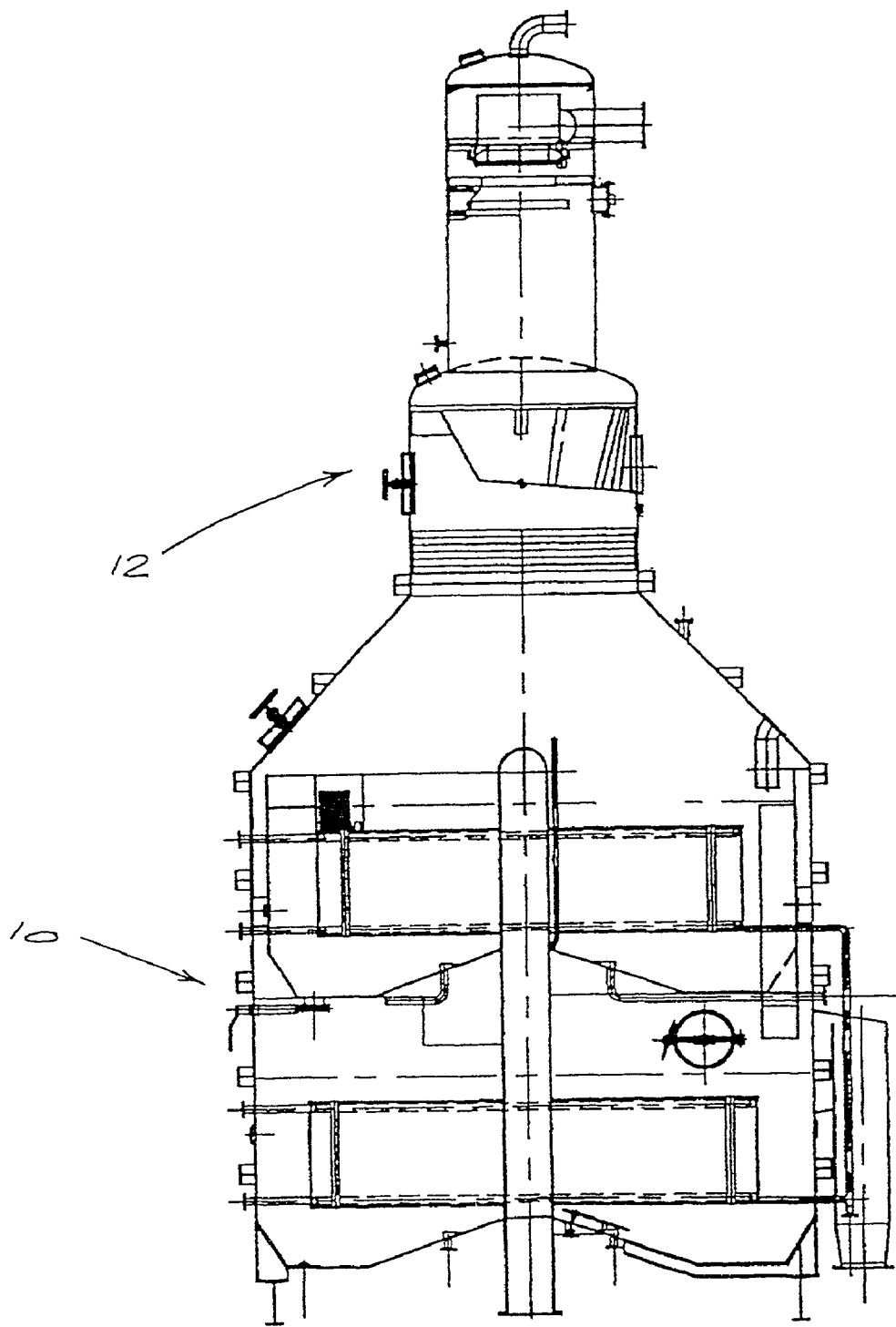

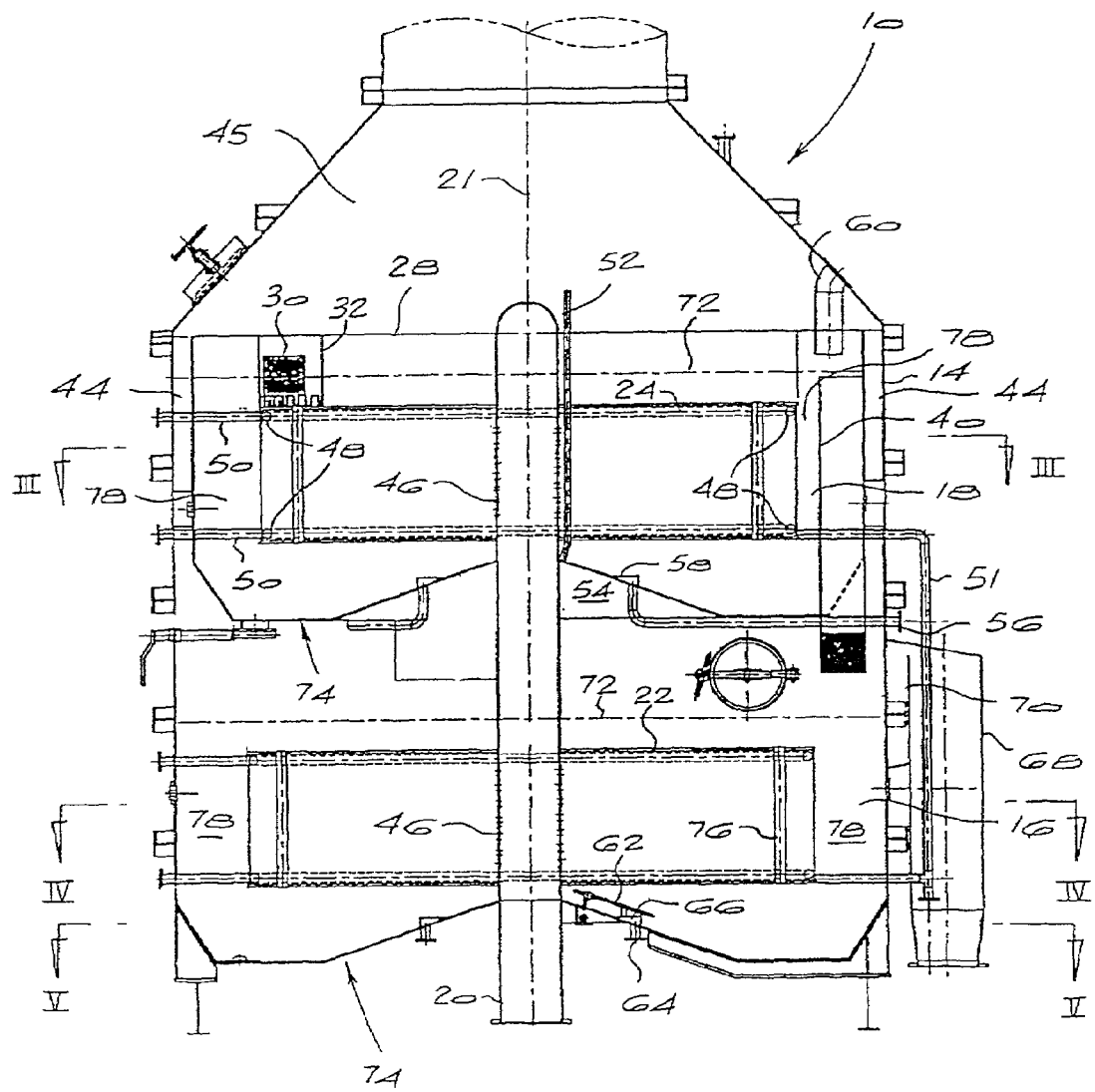

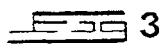
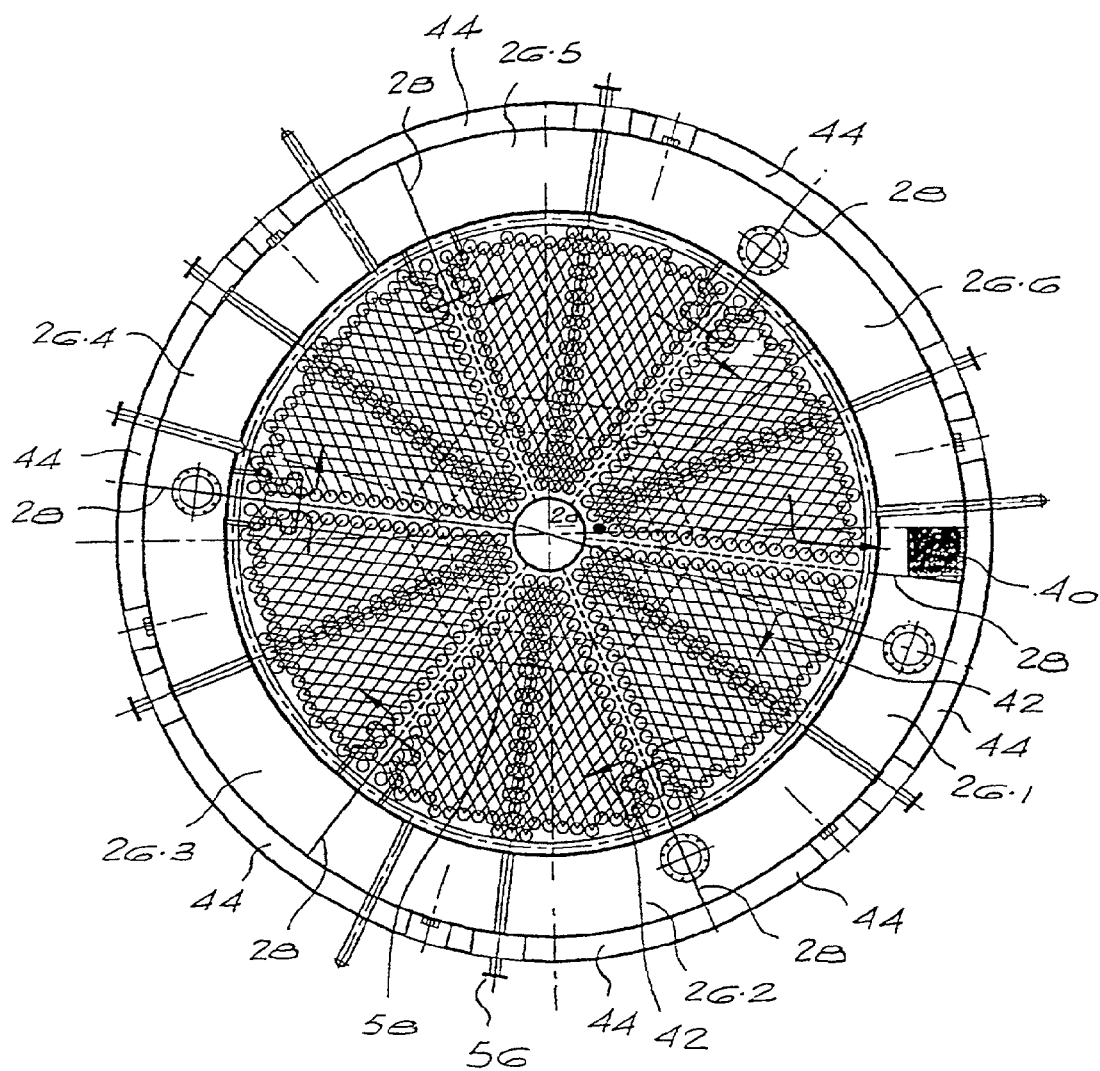

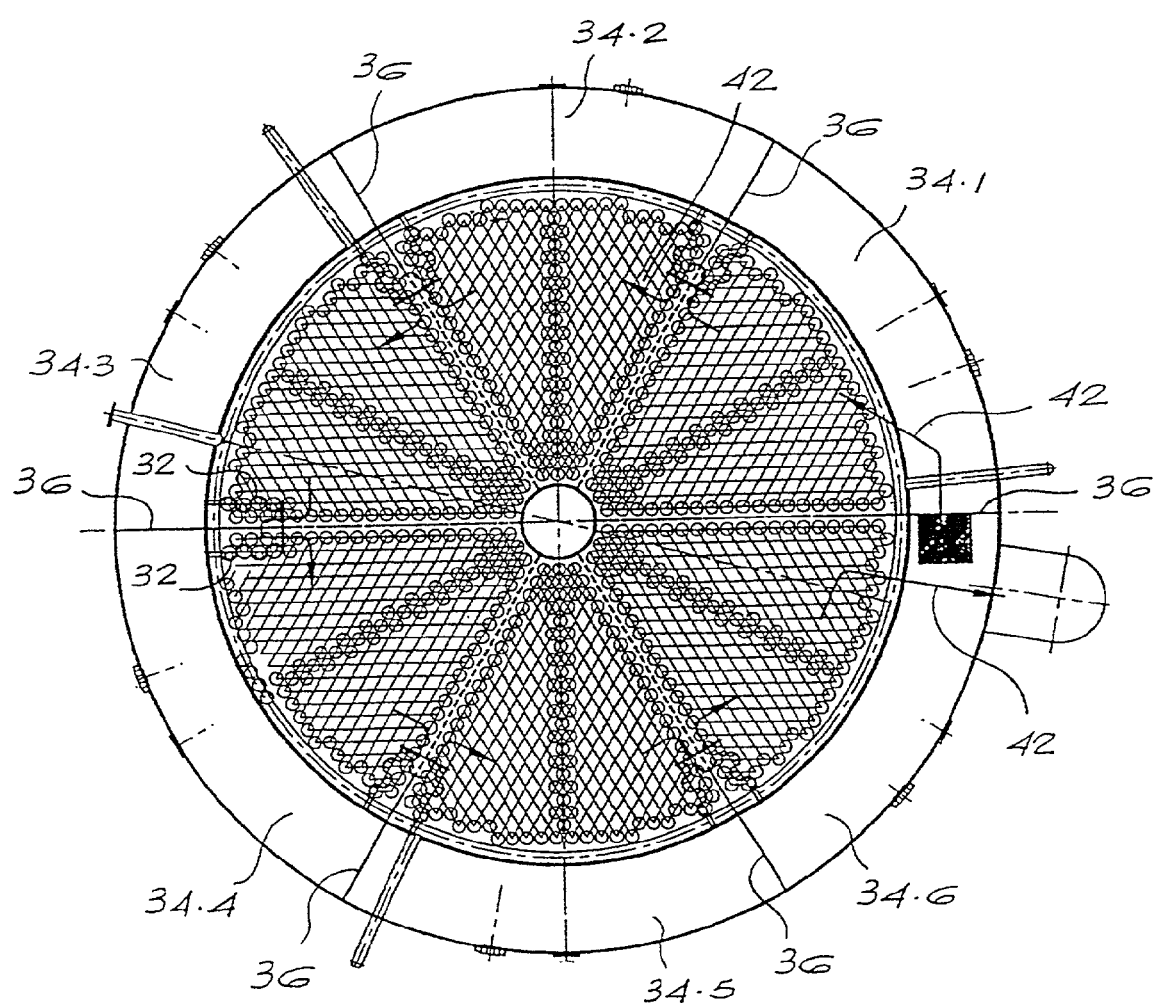

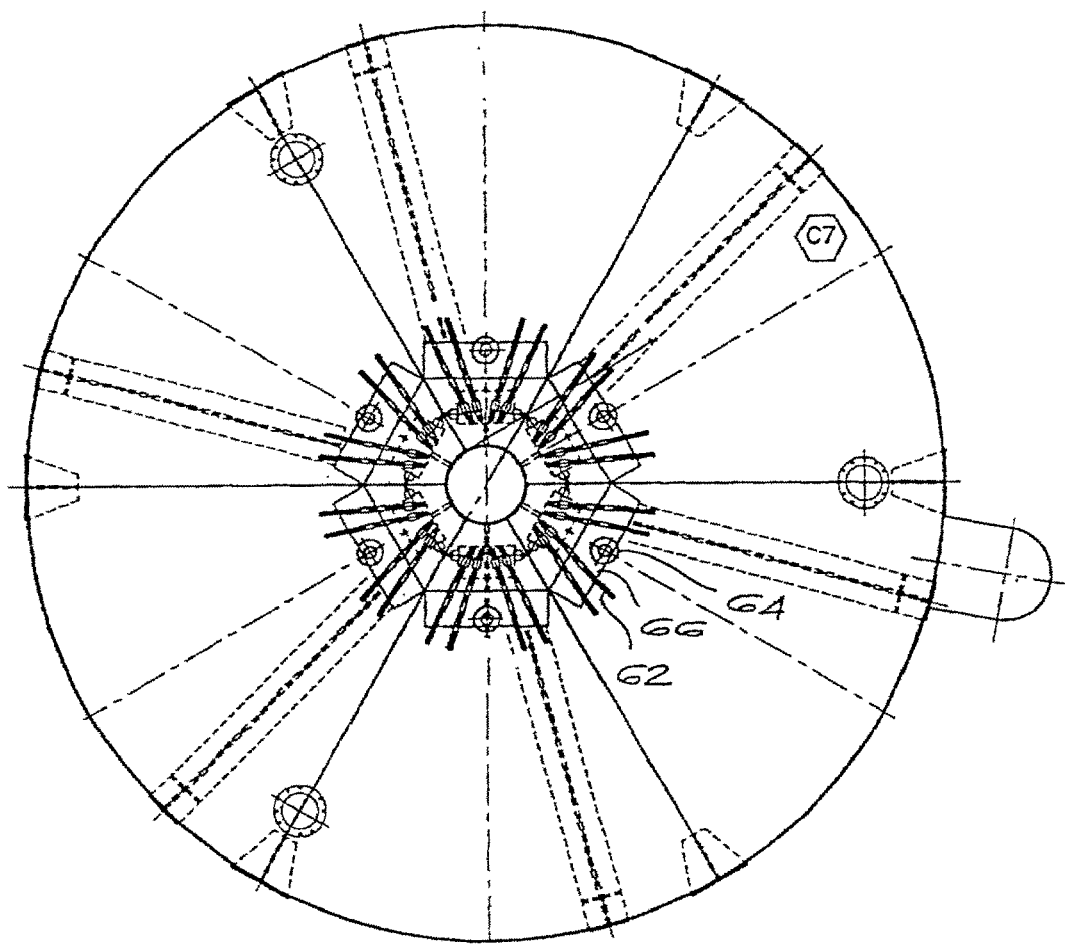

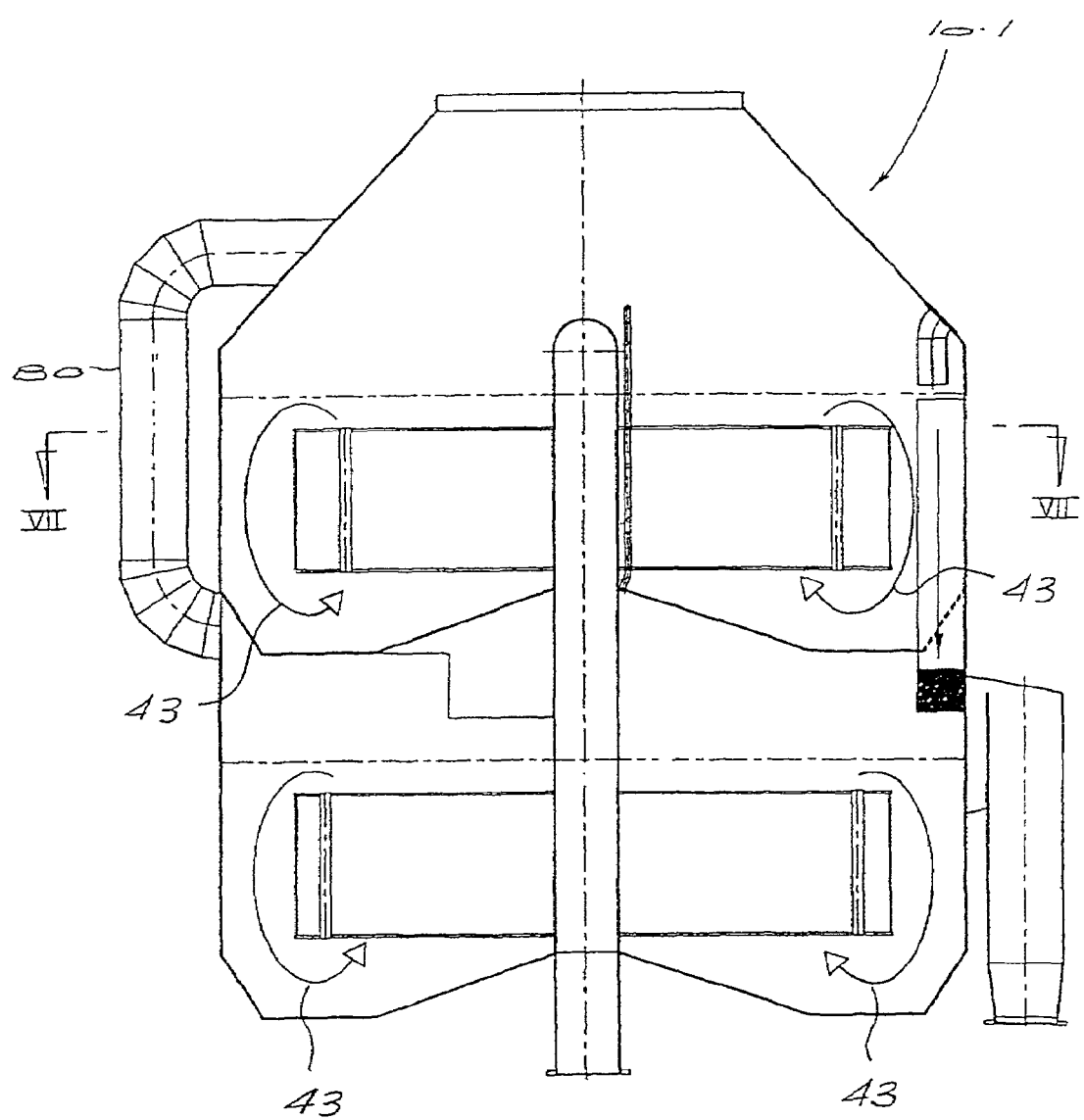

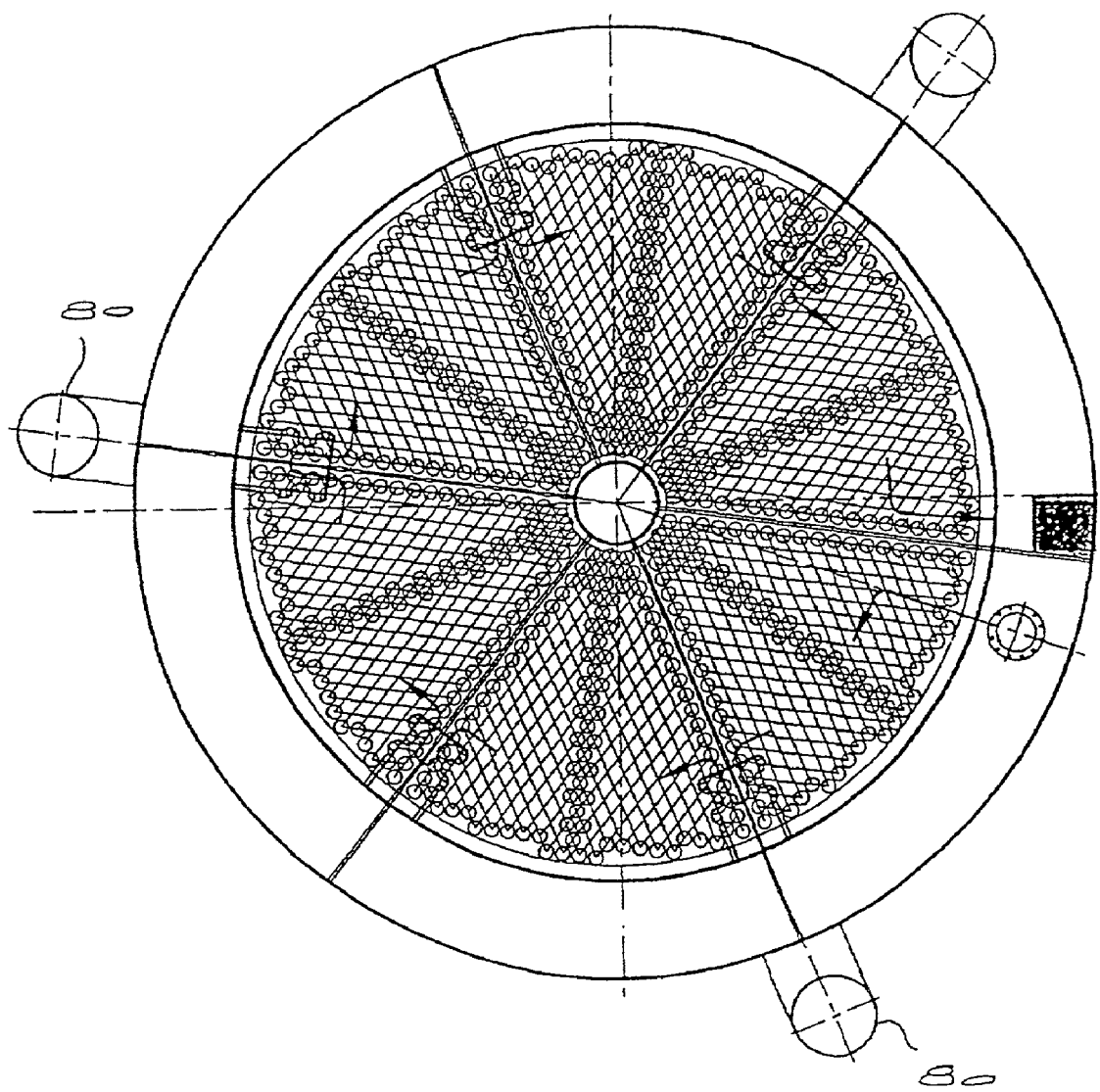

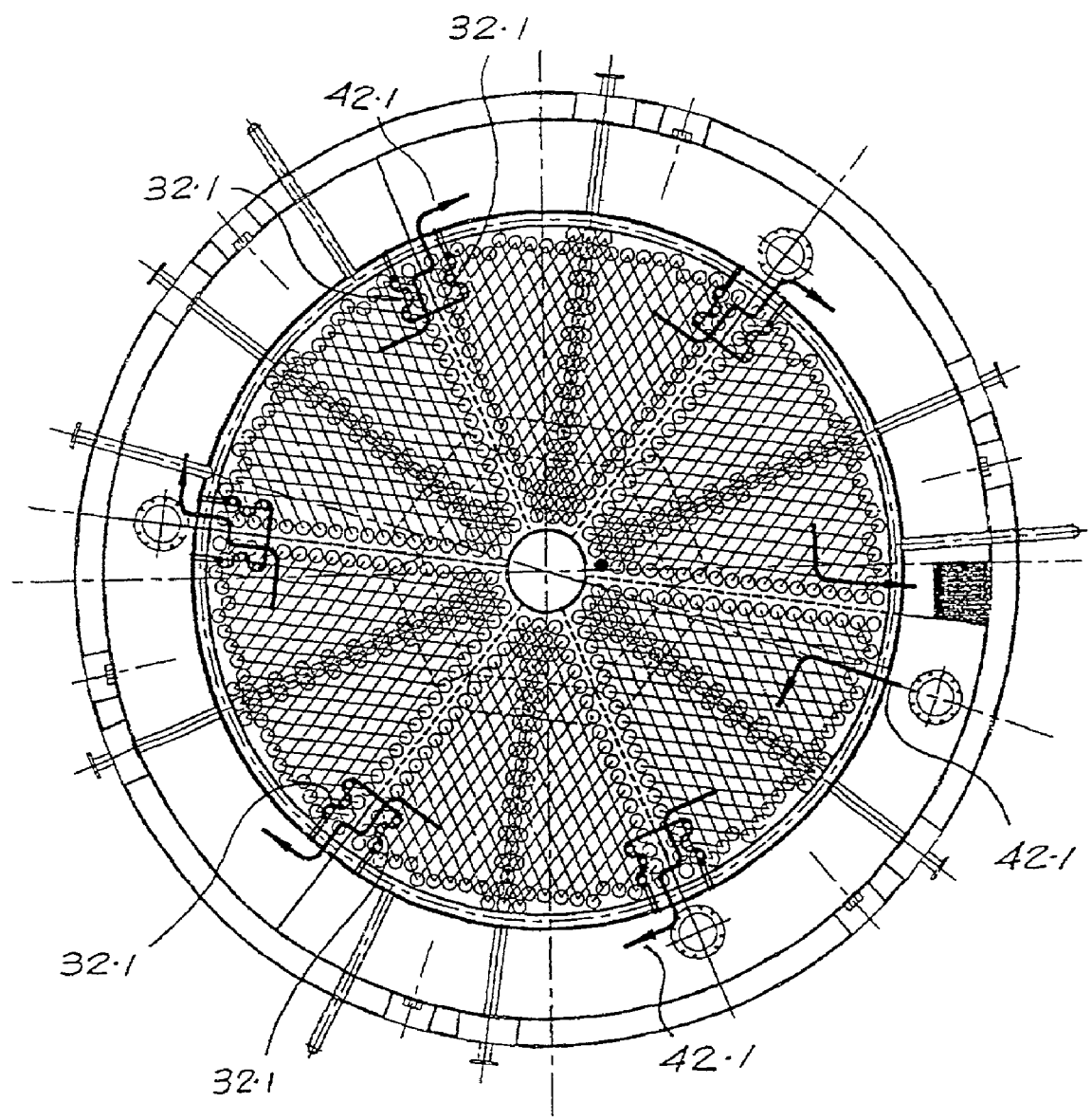

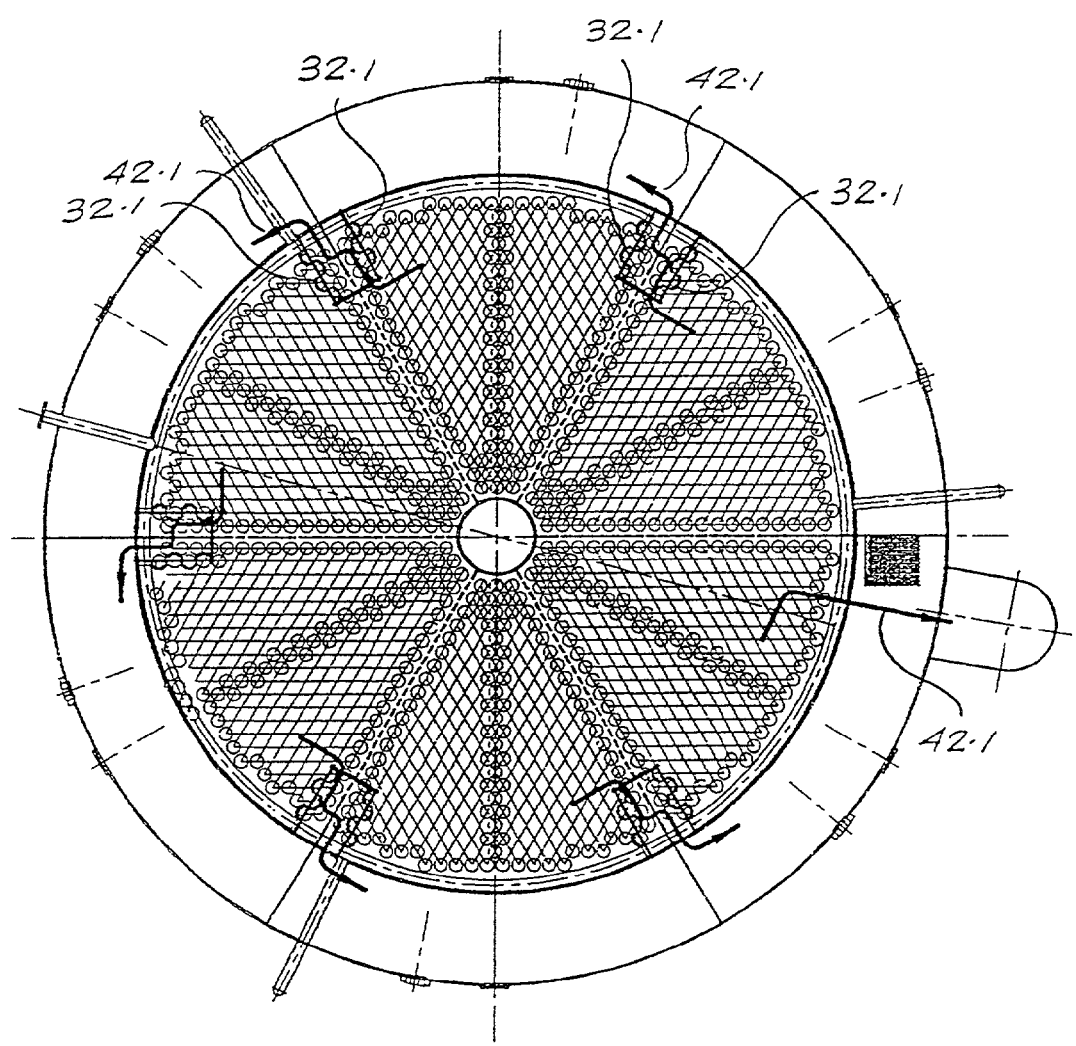

US 6,991,708 B2

CONTINUOUS VACUUM PAN

CROSS-REFERENCE TO RELATED APPLICATIONS

This application is a continuation of the U.S. national stage designation of copending International Patent Application PCT/IB01/00942, filed May 30, 2001, the entire content of which is expressly incorporated herein by reference thereto.

FIELD OF THE INVENTION

This invention relates to a continuous vacuum pan for crystallizing the solute of a solution.

BACKGROUND TO THE INVENTION

U.S. Pat. No. 3,880,593 to Windal describes a crystallization apparatus in the form of a cylindrical tank with a floating calandria or a fixed calandria. A lower portion of the tank has radially extending dividing walls to define therebetween a plurality of compartments located in series with one another. The dividing walls have ports at their bases to permit the continuous flow of a solute containing solution from one compartment to the other. The bottom of the tank has an inverted V-shape. Feeding means for feeding an undersaturated solution of the solute into successive compartments is arranged in an upper portion of the tank for rotation about the vertical axis of the tank to sweep over successive compartments. Shutters are provided for controlling the amount of the undersaturated solution fed to each of the compartments.

South African patent 84/6920 to the applicant describes a continuous vacuum pan crystallizer which is essentially a long path horizontal vessel with vertical tube floating calandrias in each compartment.

It is an object of this invention to provide an improved continuous vacuum pan.

SUMMARY OF THE INVENTION

According to the invention a continuous vacuum pan includes:
a cylindrical housing having a vertical axis;
at least one liquid heating pan within the housing;
a vertical tube, floating calandria within the liquid heating pan, the vertical tube floating calandria having a downcomer between its periphery and the periphery of the liquid heating pan, with a gap between the bottom of the calandria and the bottom of the liquid heating pan;
radially extending baffles in the liquid heating pan defining a plurality of compartments located in series with one another, the compartments ranging from a first upstream compartment to a downstream output compartment; and
ports in all of the baffles, except in the baffle between the output compartment and the first compartment, the ports being spaced from the bottom of the liquid heating pan and permitting communication between the compartments.

The ports may be located above the bottom of the calandria and preferably above the top of the calandria. Guiding baffles may be provided for guiding the liquid from the ports onto the periphery of the calandria or directly into the downcomer.

The bottom of the liquid heating pan may be substantially W-shaped.

The cylindrical housing may be a circular cylindrical housing and the vertical tube floating calandria may be circular in plan view.

The pan preferably includes a vertically extending heating fluid conduit, for supplying heating fluid to the calandria. The vertical axis of the heating fluid conduit preferably coincides with the vertical axis of the housing.

Each compartment preferably has its own feed or solution inlet for feeding solution separately and simultaneously into each compartment.

The pan may include two liquid heating pans comprising an upper liquid heating pan located above, and in series with, a lower liquid heating pan. It will be appreciated that the pan may include more than two liquid heating pans, with the liquid heating pans being stacked one on top of the other.

A downstream output compartment of the upper liquid heating pan preferably communicates with a first upstream compartment of the lower liquid heating pan.

The upper and lower liquid heating pans are preferably in vapour communication with one another so that vapour generated by the heating of the liquid in the lower pan can be removed from the lower pan together with vapour generated by the heating of the liquid in the upper pan via a common vapour zone located above the upper pan.

The vapour communication may be achieved by at least one peripherally extending passageway located between the housing and the upper pan. Alternatively, the vapour communication may be achieved by ducts located externally to the housing. Yet further alternatively, the vapour communication may be achieved by a plurality of conduits located between the housing and the upper pan, each conduit being in communication with its own compartment in the lower pan.

According to another aspect of the invention a method of crystallizing the solute of a solution by evaporating the solvent of the solution in a continuous operation in a vacuum pan having a plurality of compartments located in series with one another and divided from one another by radially extending baffles, the compartments ranging from a first upstream compartment to a downstream output compartment, the method including the steps of heating the solution within each compartment via a vertical tube floating calandria so that the solution will flow upwardly through vertical tubes of the calandria, across the top of the calandria, downwardly through a downcomer between the periphery of the calandria and the periphery of the compartment along a gap between the bottom of the calandria and the bottom of the compartment, and back into the vertical tubes of the calandria, and discharging excess solution from upstream compartments to downstream compartments through ports in the baffles onto the calandria towards the periphery of the calandria or directly into the downcomer.

BRIEF DESCRIPTION OF THE DRAWINGS

FIG. 1 is a partly cut away side view of a vacuum pan according to the invention with an internal condenser;
FIG. 2 is an enlarged view of the vacuum pan of FIG. 1;
FIG. 3 is a cross-sectional plan view on line III—III of FIG. 2;
FIG. 4 is a cross-sectional plan view on line IV—IV of FIG. 2;
FIG. 5 is a cross-sectional plan view on line V—V of FIG. 2;
FIG. 6 is a cross-sectional side view of a vacuum pan according to another aspect of the invention;

FIG. 7 is a cross-sectional plan view on line VII—VII of FIG. 6;

FIG. 10 is the same view as FIG. 3 but with modified small baffles on either side of the ports; and FIG. 11 is the same view as FIG. 4 but with modified small baffles on either side of the ports.

DETAILED DESCRIPTION OF THE DRAWINGS

Figure 8:
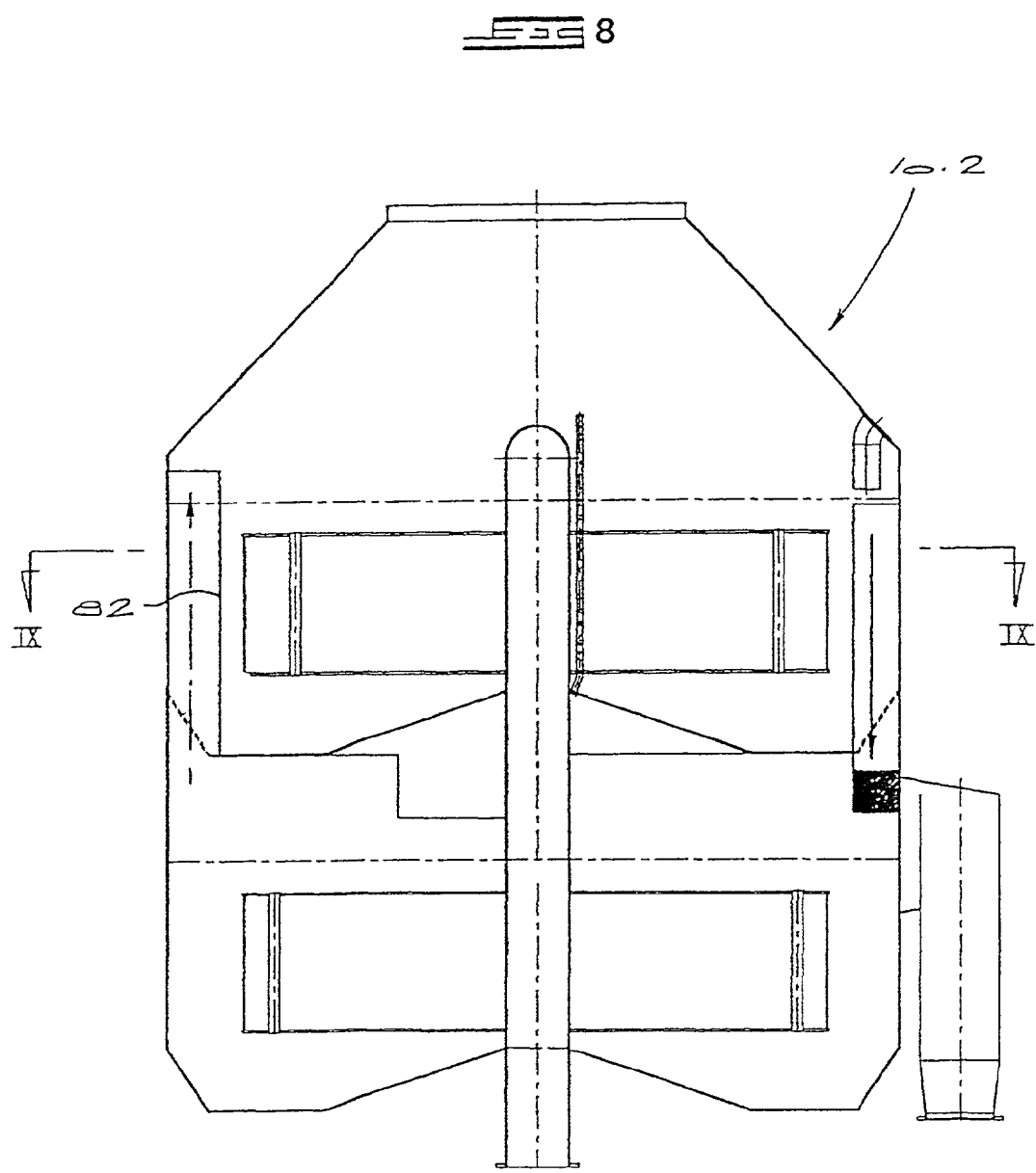
FIG. 8 is a cross-sectional side view of a vacuum pan according to a further aspect of the invention.

A double calandria continuous vacuum pan 10 with an integral condenser 12 is shown in FIG. 1.

Referring now to FIGS. 2 to 5, the pan 10 includes an outer housing 14, a lower massecuite heating pan 16, an upper massecuite heating pan 18, and a centrally located heating vapour conduit 20. The heating vapour conduit extends along the vertical longitudinal axis 21 of the housing 14.

The lower and upper pans 16 and 18 each contain a circular, vertical tube, floating calandria 22 and 24 respectively.

The upper pan 18 is divided into six compartments 26.1 to 26.6 by baffles 28.

The baffles 28 extend radially from the conduit 20. The compartments 26.1 to 26.6 communicate with one another via ports 30 in the baffles 28. The ports 30 are located above the top of the calandria 24 and towards the periphery of the calandria 24.

Small guiding baffles 32 are located one on either side of each port 30. The compartments 26.1 to 26.6 are thus located in series with one another. The baffles 28 are sufficiently high to prevent liquid mixing between the compartments.

The lower pan 16 is also divided up into six compartments 34.1 to 34.6 by baffles 36. The baffles 36 do not extend to the roof of the lower pan 16. There is sufficient space between the top of the baffles 36 and the roof of the lower pan 16 to allow a person to climb over the top of the baffles 36 from one compartment to the other. The compartments 34.1 to 34.6 communicate with one another via ports similar to those between the baffles in the upper compartments 26.1 to 26.6. As can be seen from FIGS. 3 and 4, the compartments in the upper pan 18 are angularly offset relative to the compartments in the lower pan 16. This angular offset allows the upper compartment 26.6 to communicate with the lower compartment 34.1 by conduit 40. Thus the upper compartments are located in series with the lower compartments. The flow of massecuite through the compartments is indicated by arrows 42.

As can be seen from the arrows 42, the massecuite is directed onto the calandria towards the periphery of the calandria by the small guiding baffles 32. The small guiding baffles 32 may however be arranged so that the massecuite is directed directly into a downcomer 78 as can be seen in FIGS. 10 and 11. In FIGS. 10 and 11, the small baffles are indicated by reference numeral 32.1 and the flow of massecuite is indicated by reference numeral 42.1.

It will be appreciated that the compartment 26.1 is a first upstream compartment of the upper pan, and the compartment 26.6 is a downstream output compartment of the upper pan. Likewise the compartment 34.1 is a first upstream compartment of the lower pan, and the compartment 34.6 is a downstream output compartment of the lower pan.

The upper and lower pans can each be divided into more than six compartments or into less than six compartments.

The lower pan 16 is in vapour communication with the upper pan 18 via circumferentially extending passageways 44 located between the upper pan 18 and the outer housing 14. The passageways 44 discharge into a common vapour zone 45 located above the upper pan 18.

The heating vapour conduit 20 communicates with each calandria 22 and 24 via apertures 46 in the conduit 20.

The calandrias 22 and 24 each have non-condensible gas collection pipes 48 connected to outlet pipes 50 through which the non-condensible gases are removed from the calandrias. Condensate is removed from the calandrias via pipe 51. The non-condensible gas collection pipes 48 may be in ring form as shown or a number of radially extending pipes may be used instead. The collection pipes 48 may be of different lengths to improve their collection of non-condensible gases.

A breather tube 52 is provided for conveying non-condensible gases which collect in a conical zone 54 of the lower compartment to the common vapour zone 45.

Each compartment in the upper pan 18 has a sugar solution or water inlet in the form of a pipe 56 discharging into a distributor box 58.

The upper compartment 26.1 has a seed inlet in the form of a pipe 60. The seed consists of sugar crystals in syrup. The seed may be introduced into the top or the bottom of the upper compartment 26.1.

Each compartment in the lower pan 16 has jigger steam inlets in the form of pipes 62, and a single sugar solution or water inlet in the form of a pipe 64 discharging into a distributor box 66. Jigger steam inlets may also be fitted to the compartments in the upper pan 18.

A massecuite outlet box 68 is provided adjacent the lower compartment 34.6. The outlet box 68 contains an adjustable height weir 70 for varying the position of the massecuite level in the lower pan 16. The massecuite level in the upper and lower pans is shown by lines 72. The height of the conduit 40 can be adjusted to vary the level of the massecuite in the upper pan 18.

Both the upper and lower pans have substantially W-shaped bottoms 74 to facilitate the flow of massecuite therein. The substantially W-shaped bottoms of the upper and lower pans ensure that there is an adequate circulation of the massecuite and also ensure that the heating surface to volume ratio is correct.

In use, the massecuite in each compartment flows upwardly from the bottom of the pan through vertical tubes 76 in the calandrias, over the top of the calandria to the outer edge of the calandria and downwardly through an annular gap or downcomer 78 between the calandria and the outer housing, along the W-shaped bottom 74 and back up into the vertical tubes 76. Excess massecuite is discharged into the next compartment through the port 30 in the baffle. Thus when viewed from the top of the pan (FIGS. 3 and 4), the massecuite flows in a substantially circular path from compartment to compartment. When each compartment is viewed in cross-sectional side view, the massecuite in each compartment also flows in a substantially circular path. For the sake of clarity arrows 43 in FIG. 6 illustrate the substantially circular flow path when each compartment is viewed from the side in cross-section.

The successive compartments are filled from above the calandria, with the massecuite entering each compartment being directed towards the periphery of the calandria or by being directed directly into an annular gap or downcomer 78 located between the periphery of the calandria and the periphery of the compartments. The introduction of the massecuite into successive compartments towards the periphery of the calandria or directly above the downcomer 78 reduces the possibility of the vertical tubes of the calandria being filled from the top, and also prevents short circuiting of the massecuite from one compartment to the next.

It will be appreciated that the use of vertical tubes in the floating calandrias in conjunction with the substantially W-shaped pan bottoms are important to ensure the correct circulation of massecuite in each compartment.

Vapour generated as the massecuite boils flows upwardly from each of the lower compartments through the circumferentially extending passageways 44 to the common vapour zone 45 where, together with the vapour generated in the upper compartments, it is drawn off into the integral condenser 12 and condensed to maintain a pressure in the pans which is lower than the ambient pressure. Instead of an integral condenser 12, an external condenser may be utilized.

The massecuite within the pans is maintained in a supersaturated condition to ensure crystallization of the sugar. The massecuite flows from one compartment to the next in substantially plug flow fashion to enhance the crystallization process.

Each compartment in the upper and/or the lower pans may have a water spray system (not shown) to wash down encrustation on the surfaces of the compartments. The water feed to the spray system may be intermittent and it may be controlled by a timer or by an operator.

Referring now to FIGS. 6 and 7, a vacuum pan 10.1 is the same as vacuum pan 10 except, instead of the vapour passageways 44, it has three external ducts 80. The inlet to each external duct 80 straddles a pair of compartments in the lower pan. Thus the number of ducts is equal to half the number of compartments.

Figure 9:
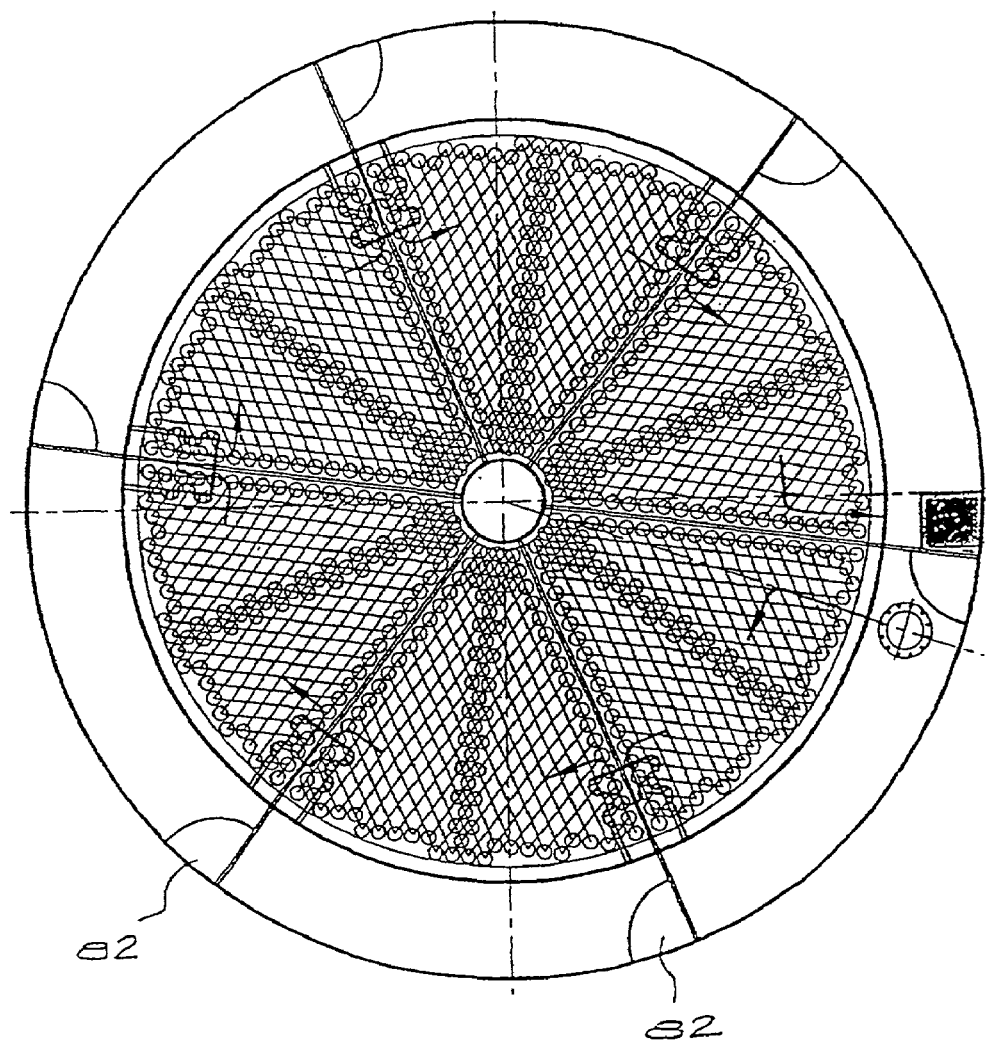
FIG. 9 is a cross-sectional plan view on line IX—IX of FIG. 8.

Referring now to FIGS. 8 and 9, a vacuum pan 10.2 is the same as the vacuum pan 10 except, that instead of the vapour passageways 44, it has quarter-round, vapour conduits 82. Each compartment in the lower pan has its own vapour conduit 82 as can be seen from FIG. 9.

It will be appreciated that many modifications or improvements of the invention are possible without departing from the spirit or scope of the invention.

What is claimed is:

1. A continuous vacuum pan comprising:
   a cylindrical housing having a vertical axis;
   at least one liquid heating pan within the housing, the liquid heating pan having a periphery and a bottom;
   a vertical tube floating calandria within the liquid heating pan, the vertical tube floating calandria having a periphery, and a bottom;
   a downcomer disposed between the periphery of the calandria and the periphery of the liquid heating pan, with a gap between the bottom of the calandria and the bottom of the liquid heating pan;
   radially extending baffles in the liquid heating pan defining a plurality of compartments located in series with one another, the compartments ranging from a first upstream compartment to a downstream output compartment; and
   ports in all of the baffles, except in the baffle between the output compartment and the first compartment, the ports being located above the top of the calandria and permitting communication of liquid between the compartments.

2. The pan of claim 1 further comprising guiding baffles for guiding liquid from the ports onto the periphery of the calandria.

3. The pan of claim 1 further comprising guiding baffles for guiding liquid from the ports directly into the downcomer.

4. The pan of claim 1 wherein the bottom of the liquid heating pan is substantially W-shaped.

5. The pan of claim 1 wherein the cylindrical housing is a circular cylindrical housing and the vertical tube floating calandria is circular in plan view.

6. The pan of claim 1 further comprising a vertically extending heating fluid conduit for supplying heating fluid to the calandria, with the heating fluid conduit having a vertical axis coinciding with the vertical axis of the housing.

7. The pan of claim 1 wherein each compartment has its own feed or solution inlet for feeding feed or solution separately and simultaneously into each compartment.

8. The pan of claim 1 wherein the at least one heating pan comprises an upper liquid heating pan located above, and in series with, a lower liquid heating pan.

9. The pan of claim 8 wherein the downstream output compartment of the upper liquid heating pan communicates with a first upstream compartment of the lower liquid heating pan.

10. The pan of claim 8 wherein the upper and lower liquid heating pans are in vapour communication with one another so that vapour generated by heating a liquid in the lower liquid heating pan can be removed from the lower liquid heating pan together with vapour generated by heating a liquid in the upper liquid heating pan via a common vapour zone located above the liquid heating pan.

11. The pan of claim 10 wherein the vapour communication is provided by at least one peripherally extending passageway located between the housing and the upper liquid heating pan.

12. The pan of claim 10 wherein the vapour communication is provided by ducts located externally to the housing.

13. The pan of claim 10 wherein the vapour communication is provided by a plurality of conduits located between the housing and the upper liquid heating pan, each conduit being in communication with its own compartment in the lower liquid heating pan.

14. A method of crystallizing the solute of a solution by evaporating the solvent of the solution in a continuous operation in a vacuum pan having a plurality of compartments with a periphery and a bottom and being located in series with one another and being divided from one another by radially extending baffles, the compartments ranging from a first upstream compartment to a downstream output compartment, the method including the steps of:
   heating the solution within each compartment via a vertical tube floating calandria having a periphery, a top, and a bottom, so that the solution will flow upwardly through vertical tubes of the calandria, across the top of the calandria, downwardly through a downcomer between the periphery of the calandria and the periphery of the compartment, along a gap between the bottom of the calandria and the bottom of the compartment, and back into the vertical tubes of the calandria; and
   discharging excess solution from upstream compartments to downstream compartments through ports in the baffles onto the calandria towards the periphery of the calandria or directly into the downcomer, the ports being located above the calandria, and with the gap between the bottom of the compartments decreasing towards the centre of the calandria to ensure adequate circulation of the solution.

15. A continuous vacuum pan comprising:
a generally cylindrical housing;
at least one liquid heating pan disposed within the housing, the liquid heating pan having a periphery, a bottom, and at least one baffle that defines a plurality of adjacent compartments;
a vertical tube floating calandria disposed within the liquid heating pan and having a periphery and a bottom; and
a downcomer disposed between the periphery of the calandria and the periphery of the liquid heating pan,
wherein the bottom of the calandria is spaced from the bottom of the liquid heating pan, and each compartment communicates with at least one other compartment at a location above the ton of the calandria.

16. The continuous vacuum pan of claim 15, wherein the at least one heating pan comprises an upper liquid heating pan and a lower liquid heating pan.

17. The continuous vacuum pan of claim 16, wherein a downstream output compartment of the upper liquid heating pan communicates with a first upstream compartment of the lower liquid heating pan.

18. The continuous vacuum pan of claim 16, wherein the upper and lower liquid heating pans are in vapour communication with one another so that vapors generated from each pan pass for removal to a common vapour zone located above the upper liquid heating pan.

19. A method of crystallizing a solute of a solution in a vacuum pan, the method comprising:
disposing the solution in a plurality of adjacent compartments that each communicate with at least one other compartment;
heating the solution;
circulating the solution via a vertical tube floating calandria comprising a periphery, a top, a bottom, and at least one vertical tube, so that the solution flows through the at least one vertical tube, across the top of the calandria, downwardly between the periphery of the calandria and periphery of a compartment, along a gap between the bottom of the calandria and the bottom of the compartment, and back into the vertical tubes of the calandria; and
discharging excess solution from upstream compartments to downstream compartments from a location above the top of the calandria.

20. The pan of claim 1 further comprising a centrally located heating fluid conduit for supplying heating fluid to the calandria.

21. The pan of claim 20 wherein the axis of the heating fluid conduit coincides with the axis of the housing.

22. The pan of claim 1 wherein the bottom of the liquid heating pan has an upwardly sloping portion so that the gap between the upwardly sloping portion and the bottom of the calandria decreases towards the centre of the calandria.

23. A continuous vacuum pan comprising:
a generally cylindrical housing;
at least one liquid heating pan disposed within the housing, the liquid heating pan having a periphery, a bottom, and at least one baffle that defines a plurality of adjacent compartments;
a vertical tube floating calandria disposed within the liquid heating pan and having a periphery and a bottom;
a downcomer disposed between the periphery of the calandria and the periphery of the liquid heating pan,
wherein the bottom of the calandria is spaced from the bottom of the liquid heating pan, and each compartment communicates with at least one other compartment;
a centrally located heating fluid conduit for supplying heating fluid to the calandria, and
wherein the bottom of the liquid heating pan is substantially W-shaped.

* * * * *